(12) United States Patent
Yoshitake et al.

(10) Patent No.: US 7,649,059 B2
(45) Date of Patent: Jan. 19, 2010

(54) ADDITION-CURABLE ORGANOPOLYSILOXANE RESIN COMPOSITION

(75) Inventors: Makoto Yoshitake, Funabashi (JP); Koji Nakanishi, Chiba (JP); Masashi Murakami, Fukuyama (JP); Kasumi Takeuchi, Ichihara (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 421 days.

(21) Appl. No.: 10/583,436

(22) PCT Filed: Dec. 17, 2004

(86) PCT No.: PCT/JP2004/019469

§ 371 (c)(1),
(2), (4) Date: May 16, 2007

(87) PCT Pub. No.: WO2005/062080

PCT Pub. Date: Jul. 7, 2005

(65) Prior Publication Data

US 2007/0244214 A1  Oct. 18, 2007

(30) Foreign Application Priority Data

Dec. 19, 2003  (JP)  ............... 2003-423726

(51) Int. Cl.
*C08L 83/04* (2006.01)
(52) U.S. Cl. ............... 525/478; 525/15; 525/31; 525/32; 525/43; 525/477; 525/479

(58) Field of Classification Search .............. None
See application file for complete search history.

(56) References Cited

U.S. PATENT DOCUMENTS

| | | | |
|---|---|---|---|
| 3,732,330 | A | 5/1973 | Mink et al. |
| 4,472,563 | A | 9/1984 | Chandra et al. |
| 6,815,520 | B2 | 11/2004 | Yoneda et al. |
| 7,153,914 | B2 * | 12/2006 | Staiger et al. ............ 525/478 |
| 2002/0161140 | A1 | 10/2002 | Yoneda et al. |
| 2004/0116640 | A1 * | 6/2004 | Miyoshi .................. 528/12 |
| 2004/0198924 | A1 * | 10/2004 | Young et al. ............. 525/474 |

FOREIGN PATENT DOCUMENTS

| | | |
|---|---|---|
| GB | 2022115 | 12/1979 |
| JP | 54159459 | 12/1979 |
| JP | 7-179763 | * 7/1995 |
| JP | 11001619 | 1/1999 |
| JP | 2002265787 | 9/2002 |

OTHER PUBLICATIONS

English language abstract for JP11001619 extracted from espacenet.com database Jan. 4, 2007.
English language abstract for JP54159459 extracted from espacenet.com database Jan. 4, 2007.
English language abstract for JP2002265787 extracted from espacenet.com database Jan. 4, 2007.

* cited by examiner

*Primary Examiner*—Marc S Zimmer
(74) *Attorney, Agent, or Firm*—Howard & Howard Attorneys PLLC

(57) ABSTRACT

Addition-curable organopolysiloxane resin composition comprising an organopolysiloxane resin that contains at least alkenyl, hydroxyl, and phenyl directly bonded to silicon of which at least 30 mole % is phenyl; an organohydrogenoligosiloxane or organohydrogenpolysiloxane that contains at least phenyl directly bonded to silicon of which at least 20 mole % is phenyl; and an addition reaction-curing catalyst.

7 Claims, No Drawings

ADDITION-CURABLE ORGANOPOLYSILOXANE RESIN COMPOSITION

RELATED APPLICATIONS

This application claims priority to and all the advantages of International Patent Application No. PCT/JP2004/019469, filed on Dec. 17, 2004, which claims priority to Japanese Patent Application No. JP 2003-423726, filed on Dec. 19, 2003.

TECHNICAL FIELD

This invention relates to an addition-curable organopolysiloxane resin composition comprising an organopolysiloxane resin that contains at least alkenyl, hydroxyl, and phenyl directly bonded to silicon; an organohydrogenoligosiloxane or organohydrogenpolysiloxane that contains at least phenyl directly bonded to silicon; and an addition reaction-curing catalyst.

BACKGROUND ART

Organic resins are used as optical components (such as optical lenses) in place of inorganic glasses based on the former's processability, light weight, lost cost, and impact resistance. The last few years, however, have seen the exposure of organic resins to high temperatures and high luminosities in association with the miniaturization of optical components and the increasing intensity of light sources. As a consequence, there is demand for the development of highly heat- and light-resistant transparent organic resins. It is widely known that silicone resins exhibit an excellent performance with regard, inter alia, to heat resistance, cold resistance, electrical insulation characteristics, weathering resistance, water repellency, and transparency, and curable silicone resin compositions are in use in a variety of industrial fields. Among these, their use as optical component materials can be contemplated because they are much more resistant to discoloration and physical deterioration than other organic resins.

Among curable silicone resin compositions, i.e., curable organopolysiloxane resin compositions, the addition-curable organopolysiloxane resin compositions are characterized by a rapid cure, by the absence of by-product generation during cure, and by an excellent moldability. As examples of such addition-curable organopolysiloxane resin compositions, Japanese Patent Publication (hereinafter referred to as "Kokoku") No. Sho 52-44900 (44,900/1977), corresponding to U.S. Pat. No. 3,732,330) discloses a curable organopolysiloxane resin composition comprising methylphenylvinylpolysiloxane resin comprising $C_6H_5SiO_{3/2}$ unit and $CH_2$=CH$(CH_3)_2SiO_{1/2}$ unit, di(dimethylhydrogensiloxy) diphenylsilane with the formula $[H(CH_3)_2SiO]_2Si(C_6H_5)_2$, and a platinum catalyst.

Kokoku No. Sho 53-20545 (20,545/1978) discloses a curable organopolysiloxane resin composition comprising methylphenylvinylpolysiloxane resin comprising monophenylsiloxane unit, diphenylsiloxane unit, dimethylsiloxane unit, and vinylmethylsiloxane unit; straight-chain methylphenylhydrogenpolysiloxane comprising diphenylsiloxane unit, methylhydrogensiloxane unit, dimethylsiloxane unit, and trimethylsiloxane unit; and a platinum catalyst. These compositions are useful as encapsulants, potting agents, and coatings for electrical and electronic components.

Japanese Patent Application Publication (hereinafter referred to as "Kokai") No. 2002-265787 provides an addition-curable silicone resin composition comprising phenyl- and alkenyl-containing a organopolysiloxane resin, a phenyl-containing organohydrogenpolysiloxane, and a hydrosilylation curing catalyst; the cured product from this composition is transparent and exhibits high strength and high hardness and is useful for electrical and electronic instruments and devices, office automation equipment, and precision equipment and machinery.

However, methylphenylvinylpolysiloxane resins are generally solids or high-viscosity liquids, and for this reason the compositions referenced above do not exhibit good fluidity or good casting properties. Kokai No. Sho 54-159459 (159,459/1979) therefore provides an addition-curable organopolysiloxane resin composition that contains diphenylbis(dimethylvinylsiloxy)silane as a reactive diluent in addition to methylphenylvinylpolysiloxane resin comprising the $C_6H_5SiO_{3/2}$ unit and $CH_2$=CH$(CH_3)_2SiO_{1/2}$ unit, dimethylhydrogensiloxyphenylsilane with the formula $[H(CH_3)_2SiO]_2Si(C_6H_5)_2$ or $[H(CH_3)_2SiO]_3Si(C_6H_5)$, and a platinum catalyst, while in its Example 1 Kokai No. Hei 11-1619 (1,619/1999) describes an addition-curable silicone resin composition that contains disiloxane with the formula $[CH_2$=CH$(CH_3)_2Si]_2O$ in addition to a methylphenylvinylpolysiloxane resin, a methylphenylhydrogenoligosiloxane, and a platinum catalyst.

These patent references, however, neither describe nor suggest a curable organopolysiloxane resin composition or an addition-curable silicone resin composition that can give a cured product that is resistant to the phenomenon in which the entire cured product clouds up, with an attendant decline in light transmittance, when the cured product is cooled after being heated under high humidities. A cured article that has clouded up and suffered a decline in light transmittance is unqualified for use as an optical element. For example, with regard to such applications as an optical lens adjacent to a light-emitting element or as a molding material, sealant, coating, or adhesive for a light-emitting element or a light-receiving element, the reduction in light flux due to clouding of the cured material can cause defective operation or a decline in functionality. In addition, some of the preceding patent references suggest that a cured article with a hardness and strength satisfactory for practical applications is not obtained from addition-curable organopolysiloxane resin compositions that have a viscosity at 25° C. of less than 1 Pa·s.

The other patent references neither describe nor suggest a relationship between viscosity and hardness or strength. While a lower viscosity for an addition-curable organopolysiloxane resin composition is not necessarily always better, the viscosity is preferably as low as possible when the curing procedure involves, for example, spin coating or infiltration into a confined space under the action of an infiltration pressure. In the case of addition-curable organopolysiloxane resin compositions with a viscosity of 1 Pa·s or more, the additional requirement of, for example, solvent dilution or heating causes a reduction in processability.

SUMMARY OF THE INVENTION

As a result of extensive investigations directed to solving the problems identified above, the inventors achieved the addition-curable organopolysiloxane resin composition according to the present invention by specifying the content of the alkenyl, hydroxyl, and phenyl in a organopolysiloxane resin that contains at least alkenyl, hydroxyl, and phenyl; by specifying the content of the phenyl group and silicon-bonded hydrogen in a phenyl-containing organohydrogenpolysiloxane; and by specifying the mixing ratio of these components.

The object of this invention is to provide an addition-curable organopolysiloxane resin composition that exhibits an excellent fluidity and moldability prior to curing; that affords a transparent cured product that, while exhibiting a high hardness and a high strength, maintains its transparency without clouding or opacification even after heating under high humidity; and that, even when it has a viscosity at 25° C. less than 1 Pa·s, provides a cured product that exhibits a satisfactory hardness and strength.

The present invention relates to an addition-curable organopolysiloxane resin composition comprising (A) 100 parts by weight of an organopolysiloxane resin that has the average compositional formula:

(R$^1$ is C$_{2-10}$ alkenyl, R$^2$ is a group selected from unsubstituted or substituted monovalent hydrocarbyl (excluding alkenyl) and alkoxy wherein at least 30 mole % of R$^2$ is phenyl, and a, b, and c are positive numbers that satisfy the following: a+b+c is 1.0 to 2.0, a is at least 0.1, and c is at least 0.2)
and that contains at least alkenyl, hydroxyl, and phenyl group directly bonded to silicon, (B) 20 to 100 parts by weight of an organohydrogenoligosiloxane or organohydrogenpolysiloxane that has the average compositional formula

(R$^3$ is a group selected from unsubstituted or substituted monovalent hydrocarbyl (excluding alkenyl), alkoxy, and hydroxyl group wherein at least 20 mole % of R$^3$ is phenyl, d is 0.35 to 0.65, and e is 0.90 to 1.70) and that contains at least phenyl directly bonded to silicon, and (C) an addition reaction-curing catalyst in a catalytic quantity.

The present also relates to an addition-curable organopolysiloxane resin composition as described above, wherein the cured product therefrom has a hardness of 60 to 100 as measured by the type D durometer specified in ASTM D2240-86 and the cured product therefrom with a thickness of 4 mm exhibits, during a period of six hours after being withdrawn into a 25° C. environment with a relative humidity (RH) of 25% after having been previously held for 15 hours in an 85° C./85% RH environment, a decline in transmittance at 850 nm of no more than 10% from the initial transmittance. This invention further relates to an addition-curable organopolysiloxane resin composition as described above that has a pre-cure viscosity at 25° C. of less than 1 Pa·s and that provides cured product that has a hardness of 60 to 100 as measured by the type D durometer specified in ASTM D2240-86 and a bending strength as specified in JIS K6911 of at least 30 MPa.

The inventive addition-curable organopolysiloxane resin composition exhibits an excellent fluidity and moldability prior to curing and affords a transparent cured product that, while exhibiting a high hardness and a high strength, does not cloud up even after heating under high humidity. In other words, there is no loss of initial transparency even after exposure to a high temperature/high humidity ambient. In addition, the inventive addition-curable organopolysiloxane resin composition yields a cured product with high-hardness and high-strength even when the composition has a viscosity less than 1 Pa·s.

BEST MODE FOR CARRYING OUT THE INVENTION

Component (A), which is an organopolysiloxane resin with the average compositional formula (1) that contains at least alkenyl, hydroxyl, and phenyl directly bonded to silicon, is the base component of the inventive addition-curable organopolysiloxane resin composition. Under the catalytic action of component (C), the alkenyl and hydroxyl in component (A) undergo crosslinking by reaction (an addition reaction in the case of the alkenyl and a dehydrogenative condensation reaction in the case of the hydroxyl) with the silicon-bonded hydrogen in component (B), which results in curing.

R$^1$ in the average compositional formula (1): R$^1_a$R$^2_b$(HO)$_c$SiO$_{(4-a-b-c)/2}$ is C$_{2-10}$ alkenyl that is directly bonded to silicon and can be exemplified by vinyl, allyl, butenyl, hexenyl, and decenyl. Vinyl is preferred from the standpoints of reactivity in the addition reaction and ease of synthesis of the organopolysiloxane resin.

R$^2$ is a group that is directly bonded to silicon and that is selected from unsubstituted or substituted monovalent hydrocarbyl (excluding alkenyl) and alkoxy. The unsubstituted or substituted monovalent hydrocarbyl (excluding alkenyl) can be exemplified by alkyl such as methyl, ethyl, propyl, and cyclohexyl; aryl such as phenyl, tolyl, and naphthyl; haloalkyl such as 3-chloropropyl, 3,3,3-trifluoropropyl, and 2-(nonafluorobutyl)ethyl; and aralkyl such as ethylbenzyl and 1-phenethyl. The use of only phenyl and the use of methyl and phenyl in combination are preferred. The alkoxy can be exemplified by methoxy, ethoxy, n-propoxy, and i-propoxy, wherein methoxy and ethoxy are preferred. The proportion of alkoxy in the total R$^2$ is preferably no more than 10 mole %. At least 50 mole % of the total R$^2$ in the molecule must be phenyl in order to provide the cured product with high strength, high hardness, and transparency. HO denotes the hydroxyl group and is directly bonded to silicon.

The subscript a indicates the average number of alkenyl groups per silicon atom in component (A); the subscript b indicates the average number of groups selected from unsubstituted or substituted monovalent hydrocarbyl (excluding alkenyl) and alkoxy per silicon atom in component (A); and the subscript c indicates the average number of hydroxyl groups per silicon atom in component (A). The sum of a, b, and c is in the range of 1.0 to 2.0 and preferably is in the range of 1.5 to 2.0. a must be greater than or equal to 0.1 and c must be greater than or equal to 0.2. The properties sought for the cured product tend not to appear at values outside these ranges. Component (A) is generally a solid or sticky liquid at 25° C., and when liquid it typically has a viscosity at 25° C. of at least 10 Pa·s. Component (A) generally has a branched-chain, network, or three-dimensional molecular structure.

The siloxane units constituting component (A) can be exemplified by ViMe$_2$SiO$_{1/2}$ unit, ViMePhSiO$_{1/2}$ unit, Me$_3$SiO unit, Me$_2$SiO$_{2/2}$ unit, ViMeSiO$_{2/2}$ unit, PhSiO$_{3/2}$ unit, MeSiO$_{3/2}$ unit, ViSiO$_{3/2}$ unit, and SiO$_{4/2}$ unit, wherein Me=methyl, Vi=vinyl, and Ph=phenyl (these abbreviations also apply below). The alkoxy and hydroxyl are bonded to the silicon in the aforementioned siloxane units. Component (A) can be specifically exemplified by organopolysiloxane resins containing at least alkenyl, hydroxyl, and phenyl that have the following siloxane unit formulas and average compositional formulas. The siloxane unit formulas indicate the number of moles of each siloxane unit where the total of the siloxane units constituting the molecule is taken to be 1 mole. Below, $R^2$=moles of Me+moles of Ph.

$(ViMeSiO_{1/2})_{0.20}(Me_2SiO_{2/2})_{0.20}(PhSiO_{3/2})_{0.60}$
$(HO_{1/2})_{0.22}$ $Vi_{0.20}Me_{0.60}Ph_{0.60}(HO)_{0.22}SiO_{1.19}$ $a=0.20, b=1.20, c=0.22, a+b+c=1.62,$
Ph/$R^2$(mole %)=50.0;

$(ViMe_2SiO_{2/2})_{0.12}(PhSiO_{3/2})_{0.88}(HO_{1/2})_{0.25}$
$Vi_{0.12}Me_{0.24}Ph_{0.88}(HO)_{0.25}SiO_{1.255}$ $a=0.12, b=1.12, c=0.25, a+b+c=1.49,$
Ph/$R^2$(mole %)=78.6;

$(ViMe_2SiO_{1/2})_{0.15}(PhSiO_{3/2})_{0.85}(MeO_{1/2})_{0.03}$
$(HO_{1/2})_{0.34}$ $Vi_{0.15}Me_{0.30}(MeO)_{0.03}Ph_{0.85}(HO)_{0.34}SiO_{1.165}$ $a=0.15, b=1.18, c=0.34, a+b+c=1.67,$
Ph/$R^2$(mole %)=72.0; and $(ViMe_2SiO_{1/2})_{0.25}(PhSiO_{3/2})_{0.75}(MeO_{1/2})_{0.04}$
$(HO_{1/2})_{0.32}$ $Vi_{0.25}Me_{0.50}(MeO)_{0.04}Ph_{0.75}(HO)_{0.32}SiO_{1.07}$ $a=0.25, b=1.29, c=0.32, a+b+c=1.86,$
Ph/$R^2$(mole %)=58.1.

Component (B), which is an organohydrogenoligosiloxane or organohydrogenpolysiloxane that has the average compositional formula (2) and that contains at least phenyl, crosslinks component (A) through the hydrosilylation reaction, that is, the silicon-bonded hydrogen atoms in component (B) undergo an addition reaction with the silicon-bonded alkenyl in component (A).

The H in average compositional formula (2) refers to the hydrogen atom and is directly bonded to silicon. $R^3$ is a group selected from unsubstituted or substituted monovalent hydrocarbyl (excluding alkenyl), alkoxy, and hydroxyl wherein at least 20 mole % of $R^3$ is phenyl. The unsubstituted or substituted monovalent hydrocarbyl (excluding alkenyl) encompassed by $R^3$ can be exemplified by the same groups provided above for the unsubstituted or substituted monovalent hydrocarbyl (excluding alkenyl) encompassed by $R^2$. $R^3$ is preferably phenyl alone or methyl plus phenyl. The alkoxy can be exemplified by the same groups provided above for the alkoxy encompassed by $R^2$, wherein methoxy and ethoxy are preferred. At least 20 mole % of the total $R^3$ in the molecule must be phenyl in order to provide a cured product with high strength, high hardness, and transparency. The proportion of alkoxy in the total $R^3$ is preferably no more than 10 mole % and the proportion of hydroxyl in the total $R^3$ is preferably no more than 10 mole %.

The subscript d indicates the number of silicon-bonded hydrogen atoms per silicon atom in component (B) and is in the range of 0.35 to 0.65. The subscript e indicates the average number of $R^3$ per silicon atom in component (B) and is in the range of 0.90 to 1.70 and preferably 1.30 to 170. This component may be either a solid or liquid at 25° C., but is preferably a liquid in order to facilitate preparation of the composition according to the present invention. The viscosity of component (B) at 25° C. is preferably no greater than 10 Pa·s and more preferably is 1 to 1000 mPa·s.

Component (B) can be specifically exemplified by methylphenylhydrogenoligosiloxanes and methylphenylhydrogenpolysiloxanes that have the following siloxane unit formulas and average compositional formulas. Below, $R^3$=moles of Me+moles of Ph.

$(HMe_2SiO_{1/2})_{0.65}(PhSiO_{3/2})_{0.35},$
$H_{0.65}Me_{1.3}Ph_{0.35}SiO_{0.85}$ d=0.65, e=1.65, Ph/$R^3$(mole %)=21;

$(HMe_2SiO_{1/2})_{0.6}(PhSiO_{3/2})_{0.4}, H_{0.6}Me_{1.2}Ph_{0.4}SiO_{0.9}$ d=0.6, e=1.6, Ph/$R^3$(mole %)=25;

$(HMe_2SiO_{1/2})_{0.4}(PhSiO_{3/2})_{0.6}, H_{0.4}Me_{0.8}Ph_{0.6}SiO_{1.1}$ d=0.4, e=1.4, Ph/$R^3$(mole %)=43;

$(HMe_2SiO_{1/2})_{0.35}(PhSiO_{3/2})_{0.65},$
$H_{0.35}Me_{0.7}Ph_{0.65}SiO_{1.15}$ d=0.35, e=1.05, Ph/$R^3$(mole %)=48;

$(HMeSiO_{2/2})_{0.65}(PhSiO_{3/2})_{0.35},$
$H_{0.65}Me_{0.65}Ph_{0.35}SiO_{1.175}$ d=0.65, e=1.0, Ph/$R^3$(mole %)=35;

$(HMeSiO_{2/2})_{0.5}(PhSiO_{3/2})_{0.5}, H_{0.5}Me_{0.5}Ph_{0.5}SiO_{1.25}$ d=0.5, e=1.0, Ph/$R^3$(mole %)=50;

$(HMeSiO_{2/2})_{0.35}(PhSiO_{3/2})_{0.65},$
$H_{0.35}Me_{0.35}Ph_{0.65}SiO_{1.325}$ d=0.35, e=1.0, Ph/$R^3$(mole %)=65;

$(HMePhSiO_{1/2})_{0.6}(PhSiO_{3/2})_{0.4}, H_{0.6}Me_{0.6}Ph_{1.0}SiO_{0.9}$ d=0.6, e=1.6, Ph/$R^3$(mole %)=63; and $(HMePhSiO_{1/2})_{0.4}(PhSiO_{3/2})_{0.6}, H_{0.4}Me_{0.4}Ph_{1.0}SiO_{1.1}$ d=0.4, e=1.4, Ph/$R^3$(mole %)=71.

Component (B) may also be a combination of two or more species.

Component (B) is used at 20 to 100 parts by weight per 100 parts by weight component (A). Viewed from the perspective of the curability and the physical properties of the cured product, component (B) is used in an amount that provides preferably 0.5 to 3 moles silicon-bonded hydrogen and more preferably 0.7 to 2.0 moles silicon-bonded hydrogen in component (B) per 1 mole alkenyl in component (A).

The addition reaction catalyst (C) is required in order to induce the addition reaction between the alkenyl in component (A) and silicon-bonded hydrogen in component (B), i.e., the hydrosilylation reaction, but at the same time it can also function as a catalyst of the dehydrogenative condensation reaction between the hydroxyl in component (A) and the silicon-bonded hydrogen in component (B). However, component (C) preferably has a higher catalytic activity in the addition reaction than in the dehydrogenative condensation reaction. This catalyst can be exemplified by platinum catalysts such as platinum black, platinic chloride, chloroplatinic acid, the reaction products of chloroplatinic acid and a monohydric alcohol, chloroplatinic acid/diolefin complexes, bis(ethyl acetoacetato)platinum, bis(acetylacetonato)platinum, and chloroplatinic acid/1,3-divinyltetramethyldisiloxane complexe, and by platinum group metal catalysts such as palladium catalysts and rhodium catalysts. Platinum catalysts are preferred among the preceding. The addition reaction catalyst is used in a so-called catalytic quantity, which is generally 1-500 ppm and preferably 2-100 ppm as metal with reference to the total weight of components (A) and (B).

In addition to the components (A) to (C) described above, the addition-curable organopolysiloxane resin composition according to the present invention may contain, within a range that does not impair the object of the present invention, an organooligosiloxane that contains at least alkenyl and phenyl, in order to reduce the viscosity and improve the casting characteristics and fluidity, and a hydrosilylation reaction retarder in order to inhibit cure at ambient temperature and extend the pot life. The organooligosiloxane that contains at least alkenyl and phenyl can be specifically exemplified by 3,3-diphenyl-1,5-divinyl-1,1,5,5-tetramethyltrisiloxane, 3-phenyl-1,5-divinyl-1,1,3,5,5-pentamethyltrisiloxane, and phenyltris(dimethylvinylsiloxy)silane.

The inventive addition-curable organopolysiloxane resin composition may on an optional basis also contain, again within a range that does not impair the advantageous effects of the present invention, inorganic filler or pigment such as finely divided silica (e.g., fumed silica, quartz powder), titanium oxide, zinc oxide, etc., flame retardant, heat stabilizer, oxidation inhibitor, and so forth. The inventive addition-curable organopolysiloxane resin composition can be prepared simply by mixing the aforementioned components (A) to (C) along with any optional components. Since the curing reaction starts even at ambient temperature once components (A) to (C) have been intermixed, the pot life is preferably extended by the addition of a hydrosilylation reaction retarder. Components (A), (B), and (C) are preferably stored in the form of mixtures of combinations thereof in which no reaction occurs wherein these are mixed to homogeneity prior to use.

The viscosity of the inventive addition-curable organopolysiloxane resin composition is not critical as long as the composition is a liquid at ambient temperature. However, in order to obtain a fluidity and casting workability responsive to the curing procedure, the viscosity at 25° C. is preferably no greater than 100 Pa·s, more preferably is no greater than 10 Pa·s, and even more preferably is no greater than 1 Pa·s. The inventive addition-curable organopolysiloxane resin composition undergoes a gradual cure when held at ambient temperature, but can cure rapidly when heated. It can provide a cured product in a desired shape by, for example, injection molding, compression molding, casting, and coating. The curing temperature and curing time are generally from 30 minutes to 1 second at 100° C. to 200° C. After curing has been completed, a secondary cure (postcure) is preferably implemented for about 10 minutes to 2 hours at 150° C. to 250° C. in order to remove small or trace amounts of volatile components.

The cured product afforded by the inventive addition-curable organopolysiloxane resin composition has a hardness of 60-100 as measured by the type D durometer specified in ASTM D2240-86. JIS K7215-1986, "Durometer hardness test methods for plastics", corresponds to ASTM D2240-86. Cured product with a thickness of 4 mm molded from the inventive addition-curable organopolysiloxane resin composition exhibits, during a period of six hours after being withdrawn into a 25° C./25% RH environment after having been previously held for 15 hours in an 85° C./85% RH environment, for example, in air, a decline in transmittance at 850 nm from the initial transmittance of no more than 10%, preferably no more than 5%, and more preferably no more than 1%. Here, the initial transmittance refers to the transmittance prior to holding in the 85° C./85% RH environment. Even when a transparent cured product can be obtained from a heretofore known addition-curable organopolysiloxane resin composition, such a cured product may quickly cloud up and suffer from a loss of transparency when it is withdrawn into a 25° C./25% RH environment after having been previously held for 15 hours in an 85° C./85% RH environment.

However, a characteristic feature of the cured products afforded by the inventive addition-curable organopolysiloxane resin composition is that they do not suffer from this opacification and retain their initial transparency. This cloudiness varies depending on the humidity, temperature, and holding time in the high humidity/high temperature environment; the humidity and temperature in the environment after withdrawal from the high humidity/high temperature environment; and the thickness of the cured article. In general, the degree of clouding, that is, the reduction in light transmittance, tends to be larger (i) at higher humidities and temperatures in the high humidity/high temperature environment, (ii) at longer holding times, (iii) at lower humidities and temperatures in the post-withdrawal environment, and (iv) at larger thicknesses for the cured article. In addition, from several minutes to several hours are generally required for the maximum cloudiness to develop, after which the cloudiness gradually weakens.

Another characteristic feature of the inventive addition-curable organopolysiloxane resin composition is that it produces a cured product with a hardness of 60 to 100 (as measured by the type D durometer specified in ASTM D2240-86) and high strength, such as a bending strength of at least 30 MPa (as measured in accordance with JIS K6911), even when the composition has a low viscosity at 25° C. such as less than 1 Pa·s. In order to provide adequate strength, the heretofore known addition-curable organopolysiloxane resin compositions must have a viscosity of at least 1 Pa·s. As an example, in the case of an operation that requires a low viscosity, such as spin coating or infiltration into a confined space under the action of an infiltration pressure, this lower limit may require that the viscosity be reduced by dilution with solvent or by carrying out the operation with heating. However, because the inventive addition-curable organopolysiloxane resin composition produces a cured product with a hardness of 60 to 100 (as measured by the type D durometer specified in ASTM D2240-86) and high strength, such as a bending strength of at least 30 MPa (as measured in accordance with JIS K6911), even when the composition has a low viscosity at 25° C. such as less than 1 Pa·s, it offers the advantage of being usable in procedures that require low viscosity without the use of solvent dilution or heating.

The inventive addition-curable organopolysiloxane resin composition is well qualified for application to optical elements by virtue of the excellent transparency of its cured product and because its cured product does not suffer from a clouding-induced decline in light transmittance even after standing in a high temperature/high humidity ambient. Here, optical element refers to an element through which light passes, wherein the light can be exemplified by visible, infrared, ultraviolet, far ultraviolet, x-ray, and laser radiation. Optical elements include defined-shape articles such as optical lenses, prisms, light-guide plates, polarizing plates, light guides, sheet, and film, and irregularly-shaped materials such as molding materials, sealants, coatings, and adhesives. The inventive addition-curable organopolysiloxane resin composition, by virtue of its characteristic ability to provide a cured product with high-hardness and high-strength even when the composition has a low viscosity below 1 Pa·s, is also well qualified for application in operations that require low viscosities. Operations of this nature include spin coating, inkjet operations, microimprinting, and infiltration, which are used, for example, to fabricate thin films, for the formation of micropatterns, and for the sealing of microvoids. Specific applications include use as an underfill dielectric and for the molding or formation of an interlayer dielectric film, light waveguide, color filter, microlens array, or Fresnel lens.

EXAMPLES

The invention is explained more specifically by the synthesis examples, working examples, and comparative examples provided below, but the invention is not limited to the working examples. The viscosity was measured at 25° C. using an E-type rotary viscometer. Cured test specimens were fabricated by pouring the prepared addition-curable organopolysiloxane resin composition into a mold with dimensions of length 100 mm×width 10 mm×thickness 4 mm; curing by heating for 15 minutes at 170° C.; demolding the cured material; and carrying out a secondary cure for 30 minutes at 200° C. The type D durometer hardness was measured using the type D durometer specified in ASTM D2240-86. The bending strength was measured according to JIS K6911 using a Shimadzu spectrometer. The light transmittance at 850 nm was measured by introducing the cured test specimen into a quartz cell, filling the spaces with toluene, and measuring the transmission spectrum using an automatic spectrophotometer. The % platinum content is given in weight %.

Synthesis Example 1

52.7 g of water, 150 g of toluene, and 23.4 g of isopropyl alcohol were introduced into a four-neck flask equipped with a stirrer, reflux condenser, inlet port, and thermometer and were mixed. Then, a mixture of 95.2 g of phenyltrichlorosilane, 21.2 g of methylvinyldichlorosilane, and 19.4 g of dimethyldichlorosilane was added dropwise over one hour while stirring. After the completion of addition, the temperature was raised to 75° C. while stirring and heating under reflux was carried out for 1 hour. After cooling, the lower layer was separated off and the upper toluene solution layer washed twice with water. 100 g of 5% aqueous sodium bicarbonate solution was added to the water-washed toluene solution layer, the temperature was raised to 75° C. while stirring, and heating under reflux was carried out for 1 hour. After cooling, the lower layer was separated off and the upper toluene solution layer washed three times with water. The remaining toluene solution layer was concentrated under reduced pressure to give 82.3 g of an hydroxy-functional methylphenylvinylpolysiloxane resin (solid at 25° C.) that had the siloxane unit formula and the average compositional formula given below.

$(\text{ViMeSiO}_{1/2})_{0.20}(\text{Me}_2\text{SiO}_{2/2})_{0.20}(\text{PhSiO}_{3/2})_{0.60}$
$(\text{HO}_{1/2})_{0.22}$ $\text{Vi}_{0.20}\text{Me}_{0.60}\text{Ph}_{0.60}(\text{HO})_{0.22}\text{SiO}_{1.19}$

Synthesis Example 2

21.6 g of water, 120 g of toluene, and 36.0 g of isopropyl alcohol were introduced into a four-neck flask equipped with a stirrer, reflux condenser, inlet port, and thermometer and were mixed. 126.9 g of phenyltrichlorosilane was then added dropwise over one hour while stirring. After the completion of addition, the temperature was raised to 75° C. while stirring and heating under reflux was carried out for 1 hour. After cooling, the lower layer was separated off and the upper toluene solution layer washed twice with water. 100 g of 5% aqueous sodium bicarbonate solution was added to the water-washed toluene solution layer, the temperature was raised to 75° C. while stirring, and heating under reflux was carried out for 1 hour. After cooling, the lower layer was separated off and the upper toluene solution layer washed three times with water. A water-separation tube was installed on the reflux condenser and the water fraction was removed by heating the remaining toluene solution layer under reflux while stirring. 9.8 g of 1,3-divinyl-1,1,3,3-tetramethyldisilazane was added to the resulting toluene solution followed by heating under reflux for 2 hours while stirring. After cooling, the reaction solution was concentrated under reduced pressure to give 86.1 g of an hydroxy-functional methylphenylvinylpolysiloxane resin (solid at 25° C.) that had the siloxane unit formula and the average compositional formula given below.

$(\text{ViMe}_2\text{SiO}_{2/2})_{0.12}(\text{PhSiO}_{3/2})_{0.88}(\text{HO}_{1/2})_{0.25}$ $\text{Vi}_{0.12}\text{Me}_{0.24}\text{Ph}_{0.88}(\text{HO})_{0.25}\text{SiO}_{1.255}$

Synthesis Example 3

13.8 g of 1,3-divinyl-1,1,3,3-tetramethyldisiloxane, 90.9 g of water, 0.14 g of trifluoromethanesulfonic acid, and 200 g of toluene were introduced into a four-neck flask equipped with a stirrer, reflux condenser, inlet port, and thermometer and were mixed. 166.7 g of phenyltrimethoxysilane was then added dropwise over one hour while stirring. Heating under reflux was carried out for 1 hour after the completion of addition. After cooling, the lower layer was separated off and the toluene solution layer washed three times with water. 100 g of 5% aqueous sodium bicarbonate solution was added to the water-washed toluene solution layer, the temperature was raised to 75° C. while stirring, and heating under reflux was carried out for 1 hour. After cooling, the lower layer was separated off and the upper toluene solution layer washed three times with water. The remaining toluene solution layer was concentrated under reduced pressure to give 121.5 g of a hydroxy- and methoxy-functional methylphenylvinylpolysiloxane resin (solid at 25° C.) that had the siloxane unit formula and the average compositional formula given below.

$(\text{ViMe}_2\text{SiO}_{1/2})_{0.15}(\text{PhSiO}_{3/2})_{0.85}(\text{MeO}_{1/2})_{0.03}$
$(\text{HO}_{1/2})_{0.34}$ $\text{Vi}_{0.15}\text{Me}_{0.30}(\text{MeO})_{0.03}\text{Ph}_{0.85}(\text{HO})_{0.34}\text{SiO}_{1.165}$

Synthesis Example 4

23.7 g of 1,3-divinyl-1,1,3,3-tetramethyldisiloxane, 82.6 g of water, 0.13 g of trifluoromethanesulfonic acid, and 200 g of toluene were introduced into a four-neck flask equipped with a stirrer, reflux condenser, inlet port, and thermometer and were mixed. 151.5 g of phenyltrimethoxysilane was then added dropwise over one hour while stirring. Heating under reflux was carried out for 1 hour after the completion of addition. After cooling, the lower layer was separated off and the toluene solution layer washed three times with water. 100 g of 5% aqueous sodium bicarbonate solution was added to the water-washed toluene solution layer, the temperature was raised to 75° C. while stirring, and heating under reflux was carried out for 1 hour. After cooling, the lower layer was separated off and the upper toluene solution layer washed three times with water. The remaining toluene solution layer was concentrated under reduced pressure to give 122.2 g of an hydroxy- and methoxy-functional methylphenylvinylpolysiloxane resin that had the siloxane unit formula and the average compositional formula given below. This product was a semisolid at 25° C. and had a viscosity of at least 5000 Pa·s.

$(ViMe_2SiO_{1/2})_{0.25}(PhSiO_{3/2})_{0.75}(MeO_{1/2})_{0.04}(HO_{1/2})_{0.32}$ $Vi_{0.25}Me_{0.50}(MeO)_{0.04}Ph_{0.75}(HO)_{0.32}SiO_{1.07}$

Synthesis Example 5

52.7 g of water, 150 g of toluene, and 23.4 g of isopropyl alcohol were introduced into a four-neck flask equipped with a stirrer, reflux condenser, inlet port, and thermometer and were mixed. Then, a mixture of 95.2 g of phenyltrichlorosilane, 21.2 g of methylvinyldichlorosilane, and 19.4 g of dimethyldichlorosilane was added dropwise over one hour while stirring. After the completion of addition, the temperature was raised to 75° C. while stirring and heating under reflux was carried out for 1 hour. After cooling, the lower layer was separated off and the upper toluene solution layer washed twice with water. 100 g of 5% aqueous sodium bicarbonate solution was added to the water-washed toluene solution layer, the temperature was raised to 75° C. while stirring, and heating under reflux was carried out for 5 hours. After cooling, the lower layer was separated off and the upper toluene solution layer washed three times with water. The remaining toluene solution layer was concentrated under reduced pressure to give 80.3 g of an hydroxy-functional methylphenylvinylpolysiloxane resin (solid at 25° C.) that had the siloxane unit formula and the average compositional formula given below. Synthesis Example 1 employed a reflux period of 1 hour after the addition of the 5% aqueous sodium bicarbonate solution to the water-washed toluene solution layer; in this synthesis example this reflux period was extended to 5 hours.

$(ViMeSiO_{2/2})_{0.20}(Me_2SiO_{2/2})_{0.20}(PhSiO_{3/2})_{0.60}(HO_{1/2})_{0.13}$ $Vi_{0.20}Me_{0.60}Ph_{0.60}(HO)_{0.13}SiO_{1.235}$

Synthesis Example 6

82.2 g of 1,3-divinyl-1,1,3,3-tetramethyldisiloxane, 143 g of water, 0.38 g of trifluoromethanesulfonic acid, and 500 g of toluene were introduced into a four-neck flask equipped with a stirrer, reflux condenser, inlet port, and thermometer and were mixed. 524.7 g of phenyltrimethoxysilane was then added dropwise over one hour while stirring. Heating under reflux was carried out for 1 hour after the completion of addition. After cooling, the lower layer was separated off and the toluene solution layer washed three times with water. 0.40 g of potassium hydroxide was added to the water-washed toluene solution layer followed by heating under reflux while removing the water through a water separation tube. After the completion of water removal, concentration was carried out to a solids concentration of 75 weight % and heating under reflux was carried out for another 5 hours. After cooling and neutralization by the addition of 0.47 g of acetic acid, filtration was carried out to give a toluene solution, which was concentrated under reduced pressure to give 420 g of methylphenylvinylpolysiloxane resin (solid at 25° C.) that had the average unit formula and the average compositional formula given below.

$(ViMe_2SiO_{1/2})_{0.25}(PhSiO_{3/2})_{0.75}$ $Vi_{0.25}Me_{0.50}Ph_{0.75}SiO_{1.25}$

Synthesis Example 7

194.6 g of phenyltrimethoxysilane and 0.22 g of trifluoromethanesulfonic acid were introduced into a four-neck flask equipped with a stirrer, reflux condenser, inlet port, and thermometer and were mixed. 13.3 g of water was then added dropwise in 15 minutes while stirring. Heating under reflux was carried out for 1 hour after the completion of this addition. After cooling to room temperature, 118.6 g of 1,1,3,3-tetramethyldisiloxane was added and 88.4 g of acetic acid was then added dropwise over 30 minutes while stirring. After the completion of this addition, the temperature of the liquid mixture was raised to 50° C. while stirring and a reaction was carried out for 3 hours. After cooling to room temperature, toluene and water were added with thorough mixing followed by standing at quiescence and separation of the water layer. The toluene solution layer washed three times with water and was then concentrated under reduced pressure to give 220 g of methylphenylhydrogenoligosiloxane that had the siloxane unit formula and the average compositional formula given below. This methylphenylhydrogenoligosiloxane was a liquid at 25° C. and had a viscosity of 0.25 Pa·s.

$(HMe_2SiO_{1/2})_{0.6}(PhSiO_{3/2})_{0.4}$ $H_{0.60}Me_{1.20}Ph_{0.40}SiO_{0.90}$

Synthesis Example 8

302.8 g of phenyltrimethoxysilane and 0.27 g of trifluoromethanesulfonic acid were introduced into a four-neck flask equipped with a stirrer, reflux condenser, inlet port, and thermometer and were mixed. 32.1 g of water was then added dropwise over 15 minutes while stirring. Heating under reflux was carried out for 1 hour after the completion of this addition. After cooling to room temperature, 82.0 g of 1,1,3,3-tetramethyldisiloxane was added and 61.1 g acetic acid was then added dropwise over 30 minutes while stirring. After the completion of this addition, the temperature of the liquid mixture was raised to 50° C. while stirring and a reaction was carried out for 3 hours. After cooling to room temperature, toluene and water were added with thorough mixing followed by standing at quiescence and separation of the water layer. The toluene solution layer washed three times with water and was then concentrated under reduced pressure to give 260 g of methylphenylhydrogenpolysiloxane that had the siloxane unit formula and the average compositional formula given below. This methylphenylhydrogenpolysiloxane was a liquid at 25° C. and had a viscosity of 9.8 Pa·s.

$(HMe_2SiO_{1/2})_{0.4}(PhSiO_{3/2})_{0.6}$ $H_{0.40}Me_{0.80}Ph_{0.60}SiO_{1.10}$

Example 1

An addition-curable organopolysiloxane resin composition with a viscosity of 3.4 Pa·s was prepared by mixing the following to homogeneity: 100 parts by weight of the hydroxy-functional methylphenylvinylpolysiloxane resin prepared in Synthesis Example 1, 30 parts by weight of the methylphenylhydrogenoligosiloxane prepared in Synthesis Example 7, 0.013 parts by weight of a 1,3-divinyl-1,1,3,3-tetramethyldisiloxane solution (platinum content=5%) of a platinum-1,3-divinyl-1,1,3,3-tetramethyldisiloxane complex, and 0.20 parts by weight of 1-ethynylcyclohexanol. The cured product therefrom had a hardness (type D durometer) of 77 and a transmittance at 850 nm of 98.3%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours.

The measured transmittance values were, respectively, 98.0%, 97.8%, 98.1%, and 98.2%, which gave a transmittance reduction of 0.3%, 0.5%, 0.2%, and 0.1%. No cloudiness was observed.

Example 2

An addition-curable organopolysiloxane resin composition with a viscosity of 84 Pa·s was prepared by mixing the following to homogeneity: 100 parts by weight of the hydroxy-functional methylphenylvinylpolysiloxane resin prepared in Synthesis Example 2, 30 parts by weight of the methylphenylhydrogenpolysiloxane prepared in Synthesis Example 8, 0.013 parts by weight of a 1,3-divinyl-1,1,3,3-tetramethyldisiloxane solution (platinum content=5%) of a platinum-1,3-divinyl-1,1,3,3-tetramethyldisiloxane complex, and 0.25 parts by weight of 1-ethynylcyclohexanol. The cured product therefrom had a hardness (type D durometer) of 74 and a transmittance at 850 nm of 98.8%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 98.2%, 98.4%, 98.6%, and 98.8%, which gave a transmittance reduction of 0.6%, 0.4%, 0.2%, and 0%. No cloudiness was observed.

Example 3

An addition-curable organopolysiloxane resin composition with a viscosity of 68 Pa·s was prepared by mixing the following to homogeneity: 100 parts by weight of the hydroxy- and methoxy-functional methylphenylvinylpolysiloxane resin prepared in Synthesis Example 3, 20 parts by weight of the methylphenylhydrogenoligosiloxane prepared in Synthesis Example 7, 0.012 parts by weight of a 1,3-divinyl-1,1,3,3-tetramethyldisiloxane solution (platinum content=5%) of a platinum-1,3-divinyl-1,1,3,3-tetramethyldisiloxane complex, and 0.25 parts by weight of 1-ethynylcyclohexanol. The cured product therefrom had a hardness (type D durometer) of 75 and a transmittance at 850 nm of 99.3%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 99.0%, 98.8%, 98.5%, and 98.8%, which gave a transmittance reduction of 0.3%, 0.5%, 0.8%, and 0.5%. No cloudiness was observed.

Example 4

An addition-curable organopolysiloxane resin composition with a viscosity of 9.3 Pa·s was prepared by mixing the following to homogeneity: 100 parts by weight of the hydroxy- and methoxy-functional methylphenylvinylpolysiloxane resin prepared in Synthesis Example 4, 33 parts by weight of the methylphenylhydrogenoligosiloxane prepared in Synthesis Example 7, 0.012 parts by weight of a 1,3-divinyl-1,1,3,3-tetramethyldisiloxane solution (platinum content=5%) of a platinum-1,3-divinyl-1,1,3,3-tetramethyldisiloxane complex, and 0.25 parts by weight of 1-ethynylcyclohexanol. The cured product therefrom had a hardness (type D durometer) of 74, a bending strength of 34 MPa, and a transmittance at 850 nm of 99.5%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 99.2%, 99.2%, 99.4%, and 99.5%, which gave a transmittance reduction of 0.3%, 0.3%, 0.1%, and 0%. No cloudiness was observed.

Example 5

An addition-curable organopolysiloxane resin composition with a viscosity of 0.37 Pa·s was prepared by mixing the following to homogeneity: 100 parts by weight of the hydroxy- and methoxy-functional methylphenylvinylpolysiloxane resin prepared in Synthesis Example 4, 40 parts by weight of the methylphenylhydrogenoligosiloxane prepared in Synthesis Example 7, 10 parts by weight of 3,3-diphenyl-1,5-divinyl-1,1,5,5-tetramethyltrisiloxane, 0.015 parts by weight of a 1,3-divinyl-1,1,3,3-tetramethyldisiloxane solution (platinum content=5%) of a platinum-1,3-divinyl-1,1,3,3-tetramethyldisiloxane complex, and 0.30 parts by weight of 1-ethynylcyclohexanol. The cured product therefrom had a hardness (type D durometer) of 71, a bending strength of 33 MPa, and a transmittance at 850 nm of 99.2%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 98.3%, 98.5%, 99.1%, and 99.2%, which gave a transmittance reduction of 0.9%, 0.7%, 0.1%, and 0%. No cloudiness was observed.

Comparative Example 1

An addition-curable organopolysiloxane resin composition with a viscosity of 8.0 Pa·s was prepared by mixing the following to homogeneity: 100 parts by weight of the hydroxy-functional methylphenylvinylpolysiloxane resin prepared in Synthesis Example 5, 30 parts by weight of the methylphenylhydrogenoligosiloxane prepared in Synthesis Example 7, 0.013 parts by weight of a 1,3-divinyl-1,1,3,3-tetramethyldisiloxane solution (platinum content=5%) of a platinum-1,3-divinyl-1,1,3,3-tetramethyldisiloxane complex, and 0.20 parts by weight of 1-ethynylcyclohexanol. The cured product therefrom had a hardness (type D durometer) of 77 and a transmittance at 850 nm of 98.6%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 89.2%, 82.0%, 83.3%, and 95.5%, which gave a transmittance reduction of 9.5%, 17%, 16%, and 3.1%. A definite cloudiness was visible at hour 1 and hour 3.

Comparative Example 2

An addition-curable organopolysiloxane resin composition with a viscosity of 102 Pa·s was prepared by mixing the following to homogeneity: 100 parts by weight of the methylphenylvinylpolysiloxane resin prepared in Synthesis Example 6, 20 parts by weight of the methylphenylhydrogenoligosiloxane prepared in Synthesis Example 7, 0.012 parts by weight of a 1,3-divinyl-1,1,3,3-tetramethyldisiloxane solution (platinum content=5%) of a platinum-1,3-divinyl-1,1,3,3-tetramethyldisiloxane complex, and 0.25 parts by weight of 1-ethynylcyclohexanol. The cured product therefrom had a hardness (type D durometer) of 75 and a transmittance at 850 nm of 99.5%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 35.5%, 45.0%, 60.1%, and 68.8%, which gave a transmittance reduction of 64%, 55%, 39%, and 31%. Cloudiness was visible immediately after withdrawal into the 25° C./25% RH air and was visible even after 1 day.

Comparative Example 3

An addition-curable organopolysiloxane resin composition with a viscosity of 0.58 Pa·s was prepared by mixing the following to homogeneity: 100 parts by weight of the methylphenylvinylpolysiloxane resin prepared in Synthesis Example 6, 40 parts by weight of the methylphenylhydrogenpolysiloxane prepared in Synthesis Example 7, 10 parts by weight of 3,3-diphenyl-1,5-divinyl-1,1,5,5-tetramethyltrisiloxane, 0.015 parts by weight of a 1,3-divinyl-1,1,3,3-tetramethyldisiloxane solution (platinum content=5%) of a platinum-1,3-divinyl-1,1,3,3-tetramethyldisiloxane complex, and 0.30 parts by weight of 1-ethynylcyclohexanol. The cured product therefrom had a hardness (type D durometer) of 65, a bending strength of 16 MPa, and a transmittance at 850 nm of 99.3%. The cured product was held for 15 hours in a thermostatted/humidistatted oven at 85° C./85% RH and was then withdrawn into air at 25° C./25% RH, whereupon its transmittance at 850 nm was measured after 30 minutes, 1 hour, 3 hours, and 6 hours. The measured transmittance values were, respectively, 20.4%, 27.0%, 44.6%, and 71.0%, which gave a transmittance reduction of 79%, 73%, 55%, and 28%. Cloudiness was visible immediately after withdrawal into the 25° C./25% RH air and was visible even after 1 day.

Table 1 reports the following values: a, b, and c in average compositional formula (1) and the mole % of phenyl in $R^2$ (abbreviated as Ph %) for the component (A) used in the working and comparative examples, and d and e in average compositional formula (2) and the mole % of phenyl in $R^3$ (abbreviated as Ph %) for the component (B) used in the working and comparative examples. The values reported in parentheses in the comparative examples indicate property values that do not fall within the scope of the claims of the present invention.

TABLE 1

| | component (A) | | | | component (B) | | |
|---|---|---|---|---|---|---|---|
| | a | b | c | Ph % | d | e | Ph % |
| Example 1 | 0.20 | 1.20 | 0.22 | 50 | 0.60 | 1.60 | 25 |
| Example 2 | 0.12 | 1.12 | 0.25 | 79 | 0.40 | 1.40 | 43 |
| Example 3 | 0.15 | 1.18 | 0.34 | 72 | 0.60 | 1.60 | 25 |
| Example 4 | 0.25 | 1.29 | 0.32 | 58 | 0.60 | 1.60 | 25 |
| Example 5 | 0.25 | 1.29 | 0.32 | 58 | 0.60 | 1.60 | 25 |
| Comp. Ex. 1 | 0.20 | 1.20 | (0.13) | 50 | 0.60 | 1.60 | 25 |
| Comp. Ex. 2 | 0.25 | 1.25 | (0) | 60 | 0.60 | 1.60 | 25 |
| Comp. Ex. 3 | 0.25 | 1.25 | (0) | 65 | 0.60 | 1.60 | 25 |

Table 2 reports the following for the working and comparative examples: the blending proportions for component (A), component (B), and 3,3-diphenyl-1,5-divinyl-1,1,5,5-tetramethyltrisiloxane (reactive diluent, referred to in the table as "diluent"); the viscosity of the composition at 25° C.; the hardness of the cured product as measured using a type D durometer (abbreviated in the table as "hardness"); the bending strength; the initial transmittance at 850 nm; and the transmittance at 1 hour after withdrawal into 25° C./25% RH air after standing for 15 hours in an 85° C./85% RH oven (reported in the table as the "post-treatment transmittance"). The values reported in parentheses in the comparative examples indicate property values that do not fall within the scope of the claims for the present invention.

TABLE 2

| | blending proportions | | | viscosity | hardness | bending strength | initial transmittance | post-treatment transmittance |
|---|---|---|---|---|---|---|---|---|
| | (A) | (B) | diluent | Pa·s | | MPa | (%) | (%) |
| Example 1 | 100 | 30 | — | 3.4 | 77 | — | 98.3 | 97.8 |
| Example 2 | 100 | 30 | — | 84 | 74 | — | 98.8 | 98.4 |
| Example 3 | 100 | 20 | — | 68 | 75 | — | 99.3 | 98.3 |
| Example 4 | 100 | 33 | — | 9.3 | 74 | 34 | 99.5 | 99.2 |
| Example 5 | 100 | 40 | 10 | 0.37 | 71 | 33 | 99.2 | 98.5 |
| Comp. Ex. 1 | 100 | 30 | — | 8.0 | 77 | — | 98.6 | (82.0) |
| Comp. Ex. 2 | 100 | 20 | — | 102 | 75 | — | 99.5 | (45.0) |
| Comp. Ex. 3 | 100 | 40 | 10 | 0.58 | 65 | (16) | 99.3 | (27.0) |

INDUSTRIAL APPLICABILITY

The inventive addition-curable organopolysiloxane resin composition is useful for the fabrication of optical elements (an element through which light, e.g., visible, infrared, ultraviolet, far ultraviolet, x-ray, or laser radiation, passes) because the composition itself has an excellent fluidity and moldability and because cured products from this composition, while being transparent and exhibiting high strength and high hardness, also do not undergo clouding or opacification even after heating in the presence of high humidities.

The composition according to this invention is particularly useful for the fabrication of elements that are exposed to high temperature/high humidity ambients during service. Moreover, the inventive addition-curable organopolysiloxane resin composition, by virtue of its ability to provide a cured product with high-hardness and high-strength even when the composition has a viscosity below 1 Pa·s, is also well qualified for application in operations that require low viscosities, such as spin coating, inkjet operations, microimprinting, and infiltration operations. As a consequence, the composition according to the present invention is useful, for example, for fabrication of underfill dielectrics and for molding or formation of interlayer dielectric films, light waveguides, color filters, microlens arrays, and Fresnel lenses, which require, for example, fabrication of thin films, formation of micropatterns, and sealing of microvoids.

The invention claimed is:

1. An addition-curable organopolysiloxane resin composition comprising
   (A) 100 parts by weight of an organopolysiloxane resin that has the average compositional formula:

$$R^1_a R^2_b (HO)_c SiO_{(4-a-b-c)/2} \quad (1)$$

$R^1$ is $C_{2-10}$ alkenyl, $R^2$ is a group selected from unsubstituted or substituted monovalent hydrocarbyl, excluding alkenyl, and alkoxy wherein at least 30 mole % of $R^2$ is phenyl, and a, b, and c are positive numbers that satisfy the following: a+b+c is 1.0 to 2.0, a is at least 0.1, and c is at least 0.2 and that contains at least alkenyl, hydroxyl, and phenyl group directly bonded to silicon,
   (B) 20 to 100 parts by weight of an organohydrogenoligosiloxane or organohydrogenpolysiloxane that has the average compositional formula:

$$H_d R^3_e SiO_{(4-d-e)/2} \quad (2)$$

$R^3$ is a group selected from unsubstituted or substituted monovalent hydrocarbyl, excluding alkenyl, alkoxy, and hydroxyl group wherein at least 20 mole % of $R^3$ is phenyl, d is 0.35 to 0.65, and e is 0.90 to 1.70 and that contains at least phenyl group directly bonded to silicon, and
   (C) an addition reaction-curing catalyst in a catalytic quantity.

2. The addition-curable organopolysiloxane resin composition according to claim 1, wherein $R^1$ is vinyl, $R^2$ is methyl and phenyl, and $R^3$ is methyl and phenyl, and the addition reaction-curing catalyst is a platinum catalyst.

3. The addition-curable organopolysiloxane resin composition according to claim 1, wherein the cured product therefrom has a hardness of 60 to 100 as measured by the type D durometer specified in ASTM D2240-86 and the cured product therefrom with a thickness of 4 mm exhibits, during a period of six hours after being withdrawn into a 25° C. environment with a relative humidity of 25% after having been previously held for 15 hours at 85% relative humidity and 85° C., a decline in transmittance at 850 nm of no more than 10% from the initial transmittance.

4. The addition-curable organopolysiloxane resin composition according to claim 1, wherein said composition has a pre-cure viscosity at 25° C. of less than 1 Pa·s and provides cured product that has a hardness of 60 to 100 as measured by the type D durometer specified in ASTM D2240-86 and a bending strength as specified in JIS K6911 of at least 30 MPa.

5. The addition-curable organopolysiloxane resin composition according to claim 2, wherein the cured product therefrom has a hardness of 60 to 100 as measured by the type D durometer specified in ASTM D2240-86 and the cured product therefrom with a thickness of 4 mm exhibits, during a period of six hours after being withdrawn into a 25° C. environment with a relative humidity of 25% after having been previously held for 15 hours at 85% relative humidity and 85° C., a decline in transmittance at 850 nm of no more than 10% from the initial transmittance.

6. The addition-curable organopolysiloxane resin composition according to claim 2, wherein said composition has a pre-cure viscosity at 25° C. of less than 1 Pa·s and provides cured product that has a hardness of 60 to 100 as measured by the type D durometer specified in ASTM D2240-86 and a bending strength as specified in JIS K6911 of at least 30 MPa.

7. The addition-curable organopolysiloxane resin composition according to claim 3, wherein said composition has a pre-cure viscosity at 25° C. of less than 1 Pa·s and provides cured product that has a hardness of 60 to 100 as measured by the type D durometer specified in ASTM D2240-86 and a bending strength as specified in JIS K6911 of at least 30 MPa.

* * * * *